United States Patent
Imamura et al.

(10) Patent No.: US 6,297,872 B1
(45) Date of Patent: *Oct. 2, 2001

(54) IMAGE FORMING APPARATUS

(75) Inventors: Junichi Imamura; Yoshiaki Yamanaka, both of Hino (JP)

(73) Assignee: Konica Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 36 days.

(21) Appl. No.: 09/219,484

(22) Filed: Dec. 23, 1998

(30) Foreign Application Priority Data

Dec. 27, 1997 (JP) .................................................. 9-367898

(51) Int. Cl.$^7$ .......................... G03B 27/52; H04N 5/253; H04N 3/36; G03F 3/10; B41J 29/393
(52) U.S. Cl. ................................ 355/40; 355/41; 355/42; 355/55; 348/96; 348/97; 358/527; 358/487; 358/506; 347/19; 347/240; 347/251; 347/254
(58) Field of Search .......................... 348/96, 97; 355/55, 355/40, 41, 42; 358/527, 487, 506; 347/19, 240, 251, 254

(56) References Cited

U.S. PATENT DOCUMENTS

| | | | |
|---|---|---|---|
| 4,511,903 | * | 4/1985 | Miyazaki et al. ...................... 346/76 |
| 4,856,920 | * | 8/1989 | Sanders, Jr. ........................... 346/762 |
| 5,121,343 | * | 6/1992 | Faris ...................................... 395/111 |
| 5,625,384 | * | 4/1997 | Numata et al. ......................... 347/23 |
| 5,652,618 | * | 7/1997 | Namba .................................. 348/96 |
| 5,652,653 | * | 7/1997 | Saito et al. ............................ 396/311 |
| 5,748,287 | * | 5/1998 | Takahashi et al. ..................... 355/40 |
| 5,754,221 | * | 5/1998 | Nishimura et al. .................... 348/97 |
| 5,933,186 | * | 8/1999 | Ikari et al. ............................. 348/97 |
| 5,949,479 | * | 8/1999 | Maruyama et al. ................... 348/97 |
| 5,982,416 | * | 11/1999 | Ishii et al. .............................. 348/29 |

* cited by examiner

Primary Examiner—Russell Adams
Assistant Examiner—Khaled Brown
(74) Attorney, Agent, or Firm—Finnegan, Henderson, Farabow, Garrett & Dunner, L.L.P.

(57) ABSTRACT

An image reading apparatus includes: a size detector for detecting a first size of a first image recorded on an original; an input device for inputting a second size of a second image to be recorded on a recording medium by an image recording apparatus; a determining device for determining a reading condition to read the first image according to the first and second sizes; and a reading device for reading the first image according to the reading condition to obtain information of the first image.

7 Claims, 4 Drawing Sheets

IMAGE FORMING APPARATUS

BACKGROUND OF THE INVENTION

The present invention relates to an image reading apparatus to read an image, and an image forming apparatus to digitally print-process the image information of the image.

In the conventional analog type image forming apparatus, factors to determine the print image quality are determined by the performance of an enlarging lens, and the apparatus has no function to adjust the print image quality. Further, the processing capacity to print each frame of the film largely depends on the F-number of the lens to be used.

In contrast to this, in the digital type image forming apparatus, factors to determine the image quality are determined by the interrelationship or the like between the resolving power of the print output and the number of pixels of the original image to be inputted.

Conventionally, the image information necessary for the maximum print size is always read out from an image input apparatus such as a film scanner, or similar apparatus, and used for print processing. However, in this structure, an image information amount becomes large, and a long period of time is necessary for image processing or data transferring for image input or output, therefore, the print processing capacity can not be increased.

Further, there has been a problem that the image quality of a printed image is affected by a state of the image forming apparatus.

SUMMARY OF THE INVENTION

An object of the present invention is to provide an image reading apparatus or an image forming apparatus in which the image quality of the output image is not deteriorated, and which can provide the optimum print processing capacity even when printing is carried out in any size.

Furthermore, an another object of the present invention is to provide an image forming apparatus wherein a photographing condition in which a little deterioration in an image quality is observed, can be obtained irrespective of a state of the image forming apparatus.

As a result of deep consideration to solve such the problem, the present inventor found that it is important to calculate the number of pixels to optimize the print image quality, image processing time, and image data transferring time from the print size and negative film information, and to set the resolving power of the film image pick-up section and to calculate the magnifying power, corresponding to the number of pixels; and therefore, it is necessary to determine the resolving power of the film image pick-up based on the film size information and print size information, which are read prior to the film image pick-up, and thereby, the present invention is completed.

The above object is achieved by any one of the following structures (1), (2) and (3).

(1) An image reading apparatus comprising: a size detecting means for detecting a first size of a first image recorded on an original; an input means for inputting a second size of a second image to be recorded on a recording medium by an image recording apparatus; a determining means for determining a reading condition to read the first image according to the first size and the second size; and a reading means for reading the first image according to the reading condition to obtain information of the first image.

(2) An image recording apparatus comprising: a size detecting means for detecting a first size of a first image recorded on an original; a reading means for reading the first image recorded on the original according to a reading condition to obtain information of the first image; an image recording means for recording the second image on the recording medium according to the information of the first image; an inputting means for inputting a second size of the second image; and a determining means for determining the reading condition according to the first size and the second size.

(3) An image recording apparatus comprising: a reading means for reading a first image recorded on an original according to a reading condition to obtain information of the first image; an image recording means for recording a second image on a recording medium according to the information of the first image; a status inputting means for inputting a status of the image recording means; and a determining means for determining the reading condition according to the status.

As a preferable embodiment of the present invention, a means for adjusting an image pick-up condition of the image pick-up device has a structure to select and output the output data from the image pick-up device as needed.

Further, as another preferable embodiment, a zoom lens or a similar means having a variable magnification function is provided in the image pick-up system as the means for adjusting an image pick-up condition of the image pick-up device.

DETAILED DESCRIPTION OF THE PREFERRED EMBODIMENT

Figure 1:
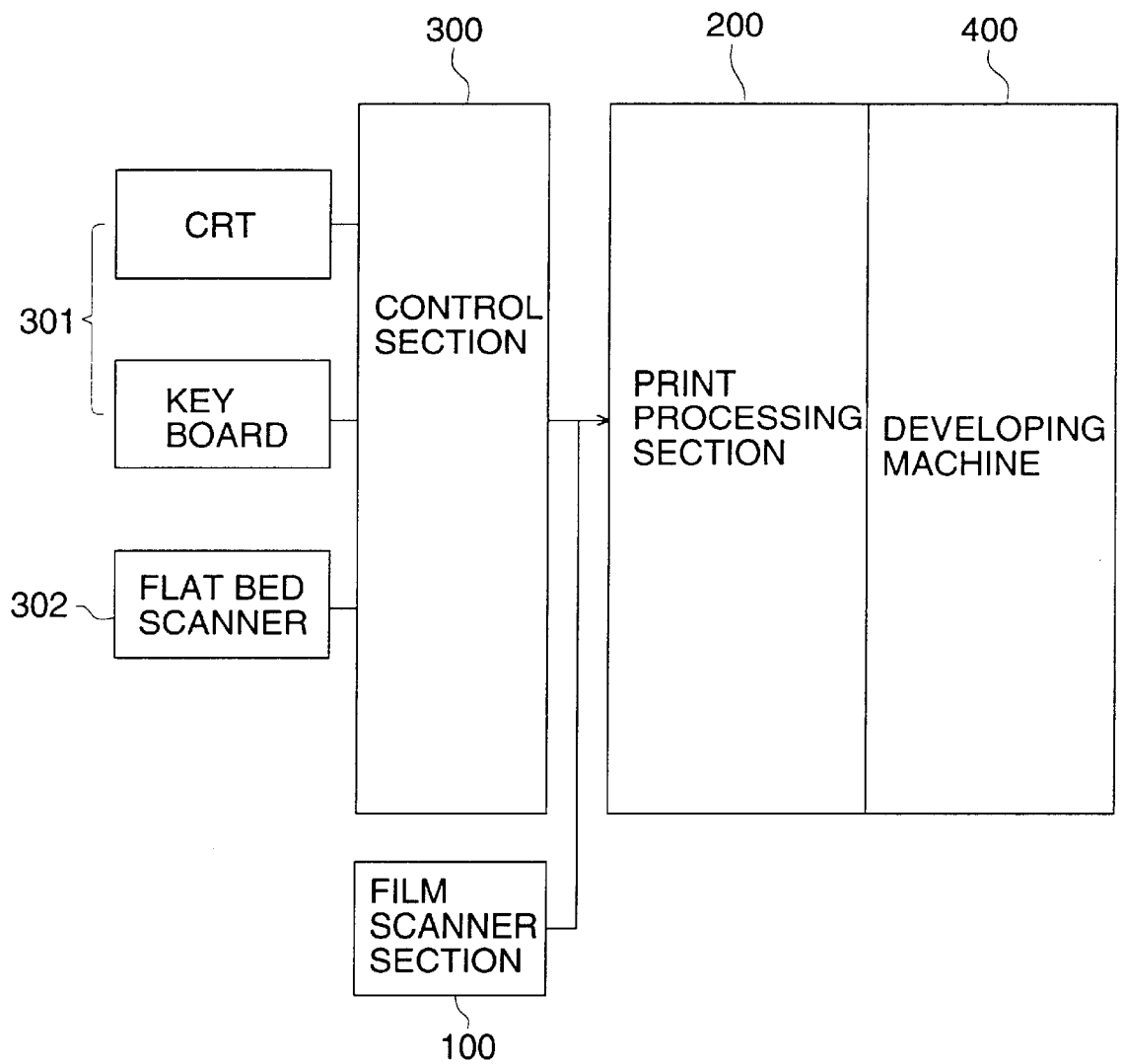
FIG. 1 is a block diagram of the entire structure of an image forming apparatus according to the present invention.

Referring to the drawings, an example of the present invention will be described below, however, the present invention is not limited by the example.

Figure 2:
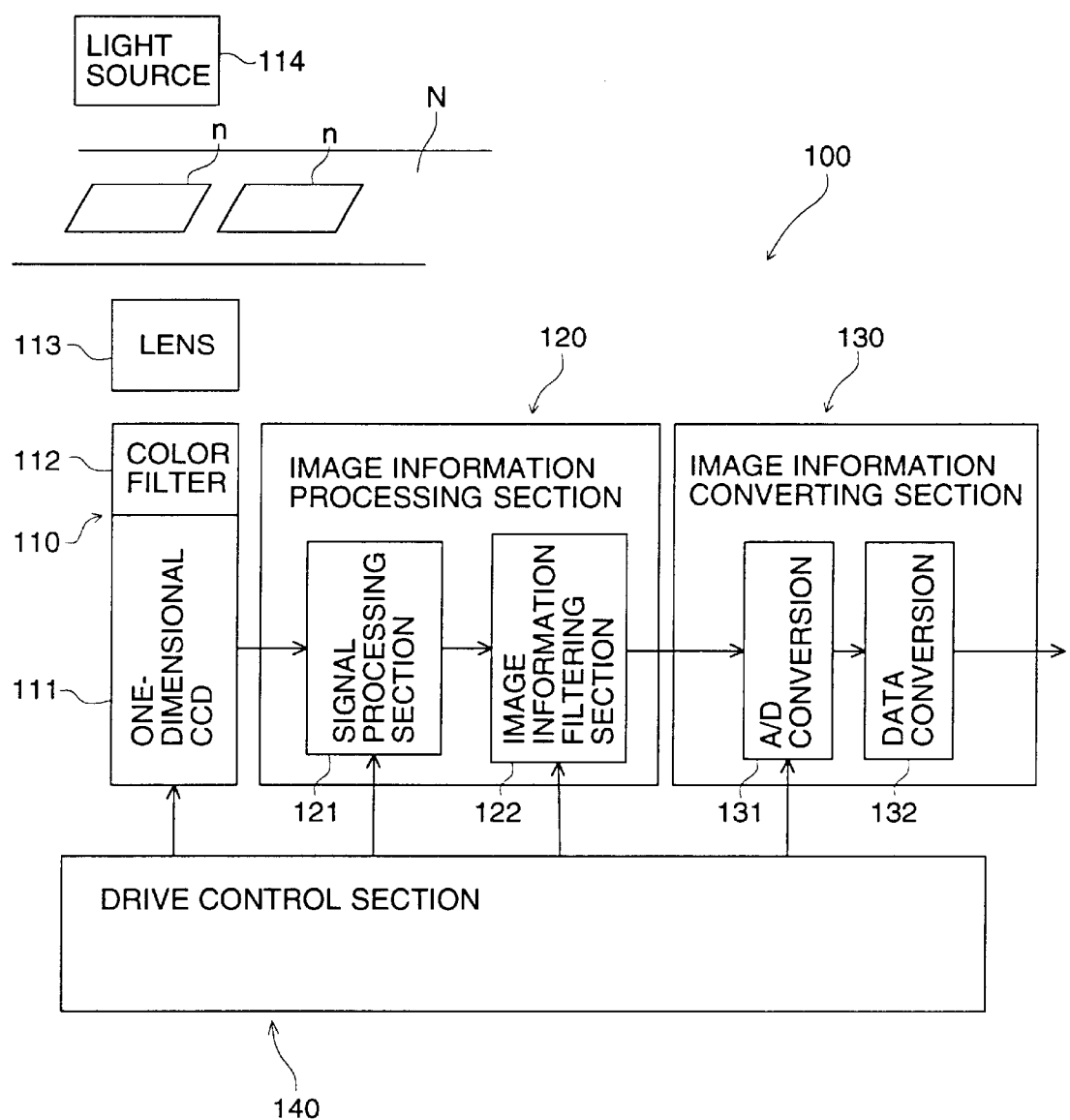
FIG. 2 is a structural view showing a film scanner section.

FIG. 1 is a block diagram of the entire structure showing an example of the structure of the image forming apparatus representing a reading means (a reading apparatus). The image forming apparatus has a film scanner section 100, a print processing section 200 and a control section 300 to control the overall apparatus and input an image from another medium. FIG. 2 shows a structural view of the film scanner section 100. An image pick-up section 100 has a one-dimensional image sensor 111 (CCD)composed of a plurality of light receiving elements, a color filter for color separation, an aperture device for light amount adjustment (not shown), and an image formation lens 113 for forming an image on the sensor, and has a structure in which an image on the negative film N illuminated by a light source 114 is inputted into the image sensor 111 through the aperture device, the lens 113, and the color filter 112.

An image information processing section 120 has a signal processing section 121, and an image information filtering section 122. The signal processing section 121 sample-holds and amplifies each of B, G, R photoelectric conversion information outputted from the image sensor 111 for each color, and outputs it as an image information output for each original color. The image information processing section 120 is structured such that the image information output for each color can be outputted to an A/D converter 131 in the image information converting section 130 through an image information filtering section (a low pass filter) 122 in the back stage.

A drive control section 140 for the image sensor 111 supplies an electric charge transfer timing signal, an electric charge read out clock signal, etc., to the image sensor 111, and drives the image sensor 111, and sends a timing signal to the signal processing section 121.

The image information converting section 130 has an A/D converter 131, and a data conversion section 132. The information which is converted into a digital value by the A/D converter 131, is inputted into the data conversion section 132, and converted into a predetermined data mode (for example, a LOG value corresponding to density, etc.), and can be converted as an image characteristic value. In this case, the data conversion section 132 is structured by, for example, a ROM table, or the like. The output of the data conversion section 132 is recorded in an image memory in the back stage.

Further, a film carrier section representing a size detecting means has a film conveyance motor (not shown), an image area detection sensor, a DX code detection, frame code detection, and magnetic information detection function, etc., and has a function which can read the information of each frame n and judge the frame size representing a size of the first image for each frame (discrimination of a full or panorama image area), while conveying the negative film N.

Figure 3:
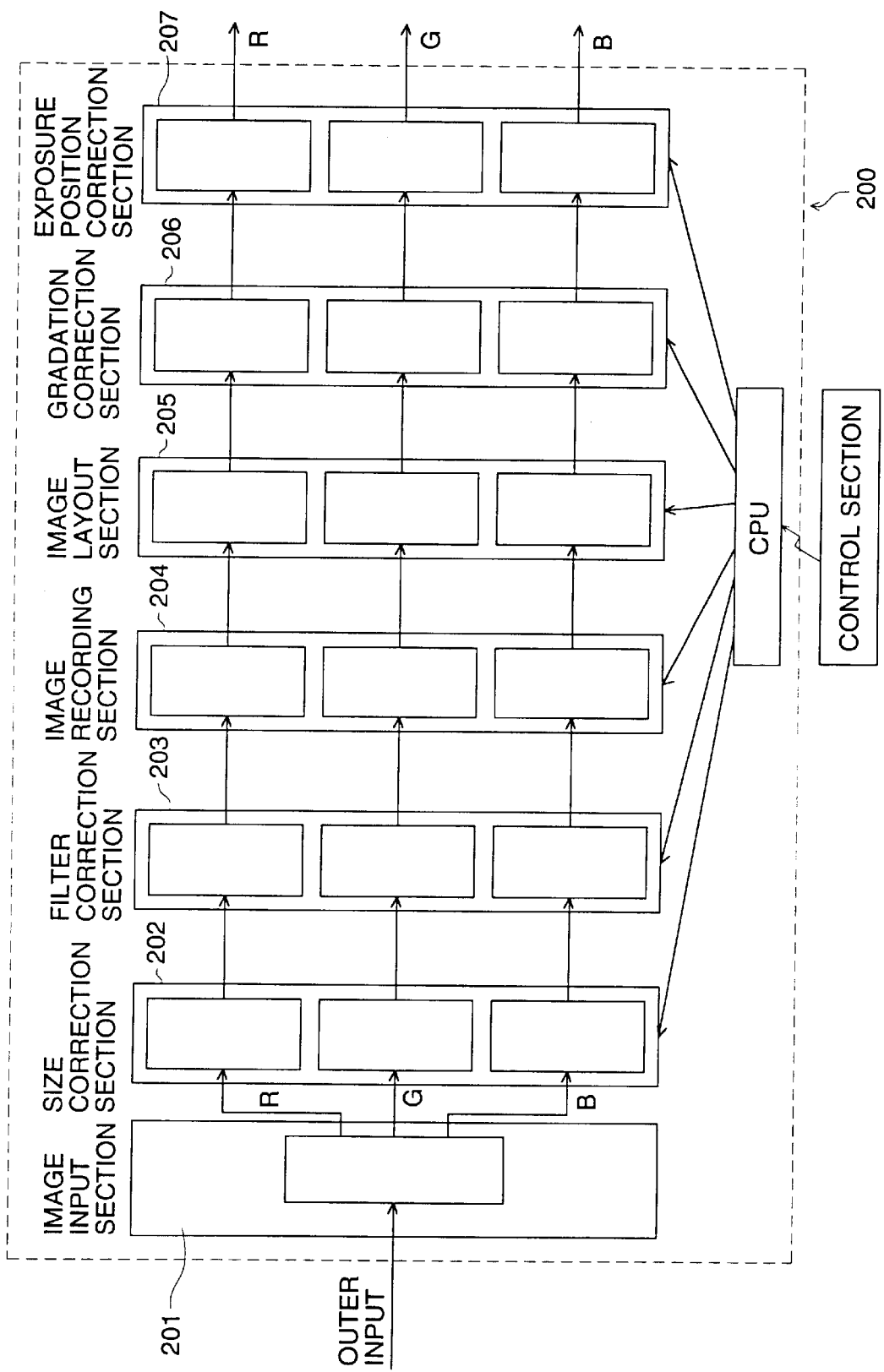
FIG. 3 is a structural view showing a print processing section

The structure of the print processing section 200 will be shown in FIG. 3. The print processing section 200 is structured by an image input section 201 which receives image data transferred from each processing section such as the film scanner section 100, etc., a size correction section 202 by which the inputted image is enlarged or reduced into a predetermined size, a filter correction section 203 which filters the inputted image for image correction, an image recording section 204 for storing an image, an image layout section 205 for adjusting the stored image to a specified output layout, a gradation correction section 206 for correcting the gradation of the output image, and an exposure position correction section 207 for processing position correction of each writing head.

Figure 4:
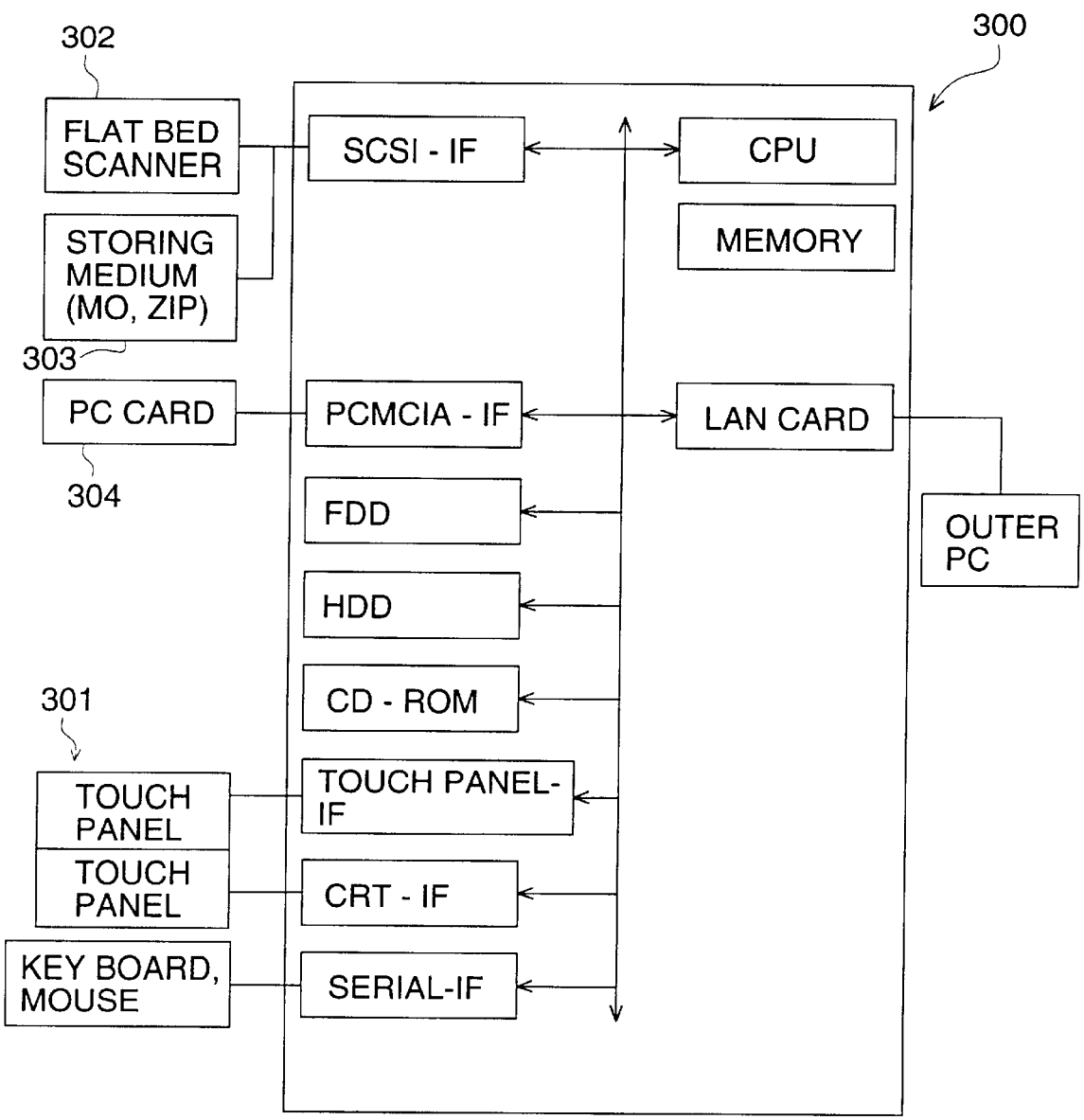
FIG. 4 is a structural view showing a control section.

The structure of the control section 300 will be shown in FIG. 4. The control section 300 has an input/output means 301(CRT for display, keyboard, or touch panel) for inputting print conditions or the like that includes the second size representing a size of the second image, and conditions for printing are inputted by the operator. Further, below the control section 300, a flat bed scanner 302 which can input the reflected document as a reading means, a serial communication input section 303 which can be connected to digital cameras, coming into wide use now, and a PC card input section 304 are provided, thereby, this type of image information is inputted and also transferred to the print processing section 200.

Incidentally, in the present invention, as a recording element used for digital recording, a light emitting type one, a heat generation type one, an ink jet nozzle, or a thermal head is used. As the light emitting type recording element, an array type head aligned array-like can be used. As the array type head, an LED array or a VFPH is used. Alternatively, for example, such a structure is also allowable that the LED array is used for a red light source, and the VFPH is used for green and blue light sources.

Light emitting elements are preferably assembled in a array type head, and may be assembled in one low or a plurality of lows. In the case of the plurality of lows, the light emitting elements may also be arranged zigzag. The array type head may be composed of one line or a plurality of lines, and in the case of the plurality of lines, each of three array lines may be separately used for each color of B, G, and R. Each of a plurality of array lines may be separately fixed on the recording material surface, or a plurality of array lines may be integrally fixed on one fixed member.

The image forming means is not specifically limited, and an ordinary image forming method such as developing (in the case of color, color development), bleaching and/or fixing (including bleach and fix), stabilizing and/or washing, and drying, may be adopted. From a view point of an increase of compactness and operating efficiency, an automatic processor shown by numeral 400 in FIG. 1 is used as an image forming apparatus, and a small automatic processor, referred to as a mini-lab which is recently commonly adopted, may also be preferably used.

Moreover, the image forming means can be applied to an ink jet printer, an electrophotographic printer, a heat sensitive transfer type printer or the like.

EXAMPLE

Next, an example of a processing sequence in which image data is read from a negative film N, and a print is produced from the image data, will be shown below.

1. A negative film N is set into a film scanner section 100.

2. The film scanner section 100 automatically loads the negative film N. At this time, the film scanner section 100 monitors an output of an image area detecting sensor in a film carrier while conveying the negative film N, and detects a leading frame of the negative film N, and stops once at the leading frame.

3. The operator confirms whether a leading frame position is correctly set or not, and presses a print start button. When the leading frame position is not correctly set, the position of the negative film N is manually adjusted, and then the printing operation is started.

4. When the print start button is pressed, the negative film N is pre-scanned once at a fixed setting at a relatively rough image, and the brightness level of the image is calculated, then the optimum image pick-up sensitivity for the frame is reset, and the image is picked-up again.

5. The picked-up image is transferred to the control section 300, and displayed on a monitor of the control section 300.

6. In the same manner, the film scanner section 100 scans the information of each frame n, while conveying the negative film N, and thus scans all images on the negative film N. However, the conveyance is carried out while the output of the image area detecting sensor on the film carrier is always monitored, and discrimination of the type of films including information relative to the first size (discrimination of an image area position, a full or panorama image area, etc.) is carried out, and corresponding to that, reading-in of the pre-scanned image is controlled.

7. When all frames are scanned, each frame image is displayed on the control section 300, and the operator confirms the image. A frame for which correction is necessary is selected from the displayed image area, and correction of the output level is carried out on the frame image.

8. When the correction is inputted, the density condition or image pick-up condition is sent from the control section 300 to the film scanner section 100, and primary scanning is started.

9. When the primary scanning is started, the film scanner section 100 scanning-processes images on the negative film N at a specified condition, and transfers the image information to the print processing section 200.

10. The transferred data is read in an image input section 201 of the print processing section 200, and sent to a size correction section 202. In the size correction section 202, enlargement/reduction processing is carried out corresponding to the film type information such as size information previously sent from the control section 300, and the image is written into an image recording section 204.

11. The image stored in the image recording section 204 is matched with the output layout specified in an image layout section 205, gradation-corrected in a gradation correction section 206, and further, image-formed on a printing paper through an exposure position correction section 207. The exposed printing paper is sent to the developing machine 400 and developing-processed therein, and a print is made.

An example, in which conditions when the negative film N is scanned by the film scanner section 100 are set, will be described below.

1. Before the negative film N is scanned, the size of the image representing the first size is determined from the information by the image area detection sensor or magnetic detection, and the information is sent to the control section 300.

2. The control section 300 determines the size of the image to be scanned and the enlargement or reduction condition of the image in the print processing section 200, from the sent image size information and the condition of the print size representing the second size to be outputted.

Example 1 of Setting (The printer side)

The output of the printer is set to 300 dpi. When the print size is 127×89 mm, the number of pixels to be required is:

longitudinally: 127×300/25.4=1500 laterally: 89×300/25.4=1051.

(The film scanner side)

The resolving power of the film scanner is 5000 dpi. When the film size is 36×24, the maximum number of pixels for image pick-up:

longitudinally: 36×5000/25.4=7086 laterally: 24×5000/25.4=4724.

Accordingly, 7086/1500=4.72, therefore, on the scanner side, data which is selected at every 4 pixels is outputted, and the scanner outputs the image of 1771×1181. The enlargement/reduction ratio in the print processing section 200 is set to 1051/1181=0.89 (when the aspect ratio is not well matched with each other, the ratio is set according to the direction in which the blank area is not generated).

Example 2 of Setting (The printer side)

The output of the printer is set to 300 dpi. When the print size is 254×89 mm, the number of pixels to be required is:

longitudinally: 254=300/25.4=3000 laterally: 89×300/25.4=1051.

(The film scanner side)

The resolving power of the film scanner is 5000 dpi. When the film size is 36×13 (panorama size), the maximum number of pixels for image pick-up:

longitudinally: 36×5000/25.4=7086 laterally: 13×5000/25.4=2559.

Accordingly, 7086/3000=2.36, therefore, on the scanner side, data which is selected at every 2 pixels is outputted, and the scanner outputs the image of 3543×1279. The enlargement/reduction ratio in the print processing section 200 is set to 3000/3543=0.84 (when the aspect ratio is not well matched with each other, the ratio is set according to the direction in which the white background is not generated).

The processing described above is realized by the selection processing of the output image, however, the processing may be allowable in which the magnification ratio is made adjustable by the zoom lens system in the film scanner section 100 so that a predetermined number of pixels are obtained.

As described above, because the number of pixels for image pick-up can be adjusted corresponding to the print size, the print processing capacity can be brought out to the maximum as will be described below. When it is necessary to sample the image at the ordinary fixed number of pixels, in the case of the same conditions as the above example, the negative image is positively picked-up at the number of pixels of 7086×4724, and accordingly, when the image is transferred to the print processing section, even when high speed digital transfer (FAST-SCSI or IEEE1394, etc.) is used, its transfer rate is 20 to 30 MB/s, therefore, it takes 3 to 5 seconds per frame for only the transfer time. In the case of digital processing, the parallel processing can be carried out in each unit comparatively in many case, however, the time necessary for actual printing processing for one frame is proportional to the print size. Therefore, there is not so large influence in the case of the large sized print, however, in the case of the small sized print, the image transfer time accounts for the large portion of the print processing time.

Next, another example will be described. In this example, only different points from the above example will be described.

Image forming means differ from each other in color tone, a size of pixel, control characteristic of the pixel, and density distribution. The density distribution of one pixel also differs in light emission/ heat emitting distribution/ a type of ink scattering. Further, a recording distance between adjoining pixels, a mixed condition of color, or a superimposition effect of the density distribution also differs.

Accordingly, an obtaining method of appropriate data for image reading is different depending on which image forming means is used as an output apparatus for image formation.

Further, even when the same image forming means is used, sometimes output color or a pixel size is changed as a result of the aging change, fault, or repair after occurrence of an accident, which is the difficulty in a maintenance operation.

According to the development of the network, conditions, in which a reading device and an image forming apparatus are separately provided, or there are many combinations of them, come into existence in companies, works, hospitals, schools, or printing works. Further, a change in the output means is also different due to the difference of the environment for use.

Therefore, the characteristic of the image forming means is stored in a host apparatus as a portion of the information of the network, and the operator who wants to record it operates a search soft and calls the characteristic of the output means (image recording apparatus) connected to the network from the host apparatus, and displays it on the image reading section or an operator's computer screen.

Herein, when the operator selects a reading means, film scanner, or flatbed scanner, he selects an output apparatus from usable image forming means. Then, the characteristic of the image recording apparatus such as the dot diameter per each pixel, the ratio of vertical/horizontal dot diameter, and density distribution in the dot, the characteristic value of the YMC color tone, the color change characteristic at the time of mixture with other colors, or the like, is read.

On the other hand, even in the same apparatus, as described above, the diameter and color of one pixel itself also change due to the aging change or details of repair, the difference of the environmental conditions (a change of temperature, recording sheet to be used, the aging change of the developing performance), the aging change of the light source or heat emitting body of the recording apparatus, the passage of time from the just before use, or the like. Accordingly, the density distribution or density itself also changes.

That is, in addition to the difference of the recording apparatus itself, the color, sharpness, and light and shade of record are changed with the passage of time, depending on the combination of the change of characteristic due to the dot characteristic, or various factors of the change (time, temperature, . . . ).

The present invention relates to a method to maintain the same color, dot diameter, and density distribution as before, by reading the image after the change in the output apparatus (image recording means) is detected and fed back to the reading means.

Further, the present invention changes the reading condition depending on the amount of data when an amount of recording data is set, or can cope with the change of ambient temperature or the change of the characteristic depending on the old apparatus and the new one, by changing the reading condition.

(1) When the output means is changed:

Concretely, when the output which is conducted hitherto by the combination in which the thermally fused ink is transferred onto the recording sheet for recording by the laser recording, is changed to the output to record by using the inkjet:

In the case of the laser recording, when the periodicity of the polygonal surface exists, or the accuracy of inclination angle correction is not satisfactory, the characteristic proper to the apparatus exists for these matters, and on the other hand, in the case of the ink jet recording, the periodicity due to the number of nozzles exists, and even when the correction means exists, the proper characteristic also exists.

In contrast to the phenomenon in which a plurality of colors are mixed on the surface of the recording sheet in the case of thermally fused ink, color mixture occurs in the deeper layer of the recording sheet in the case of inkjet. Further, color formation also differs depending on the material, and therefore, the perfectly same color can not be obtained.

In also the minimum dot, the size of one piece (heating piece) of the head is different from that of one droplet of the inkjet.

A data table is prepared for the following items:

(1) a diameter of one dot, a density distribution of one dot, the maximum density of one dot, the periodicity of the dot center(the periodicity of polygonal surface, the periodicity of the inkjet head)

(2) a distribution in the color solid of each color of ink ribbons (3) a distribution in the color solid of each color of the inkjet (4) a distribution in the color solid at the time of color mixture of each of (three colors of ink ribbons, three colors of the inkjet, or the corresponding color when a specific color is used)

(5) the reflection color density of (1), (2), (3) and (4) when each color is recorded on the recording medium at the time of fixing, at each ambient temperature.

According to this, a table of the output signal to (a dot, color, change) in the switching of the ink ribbon thermal fusing and the inkjet recording, is prepared, and when the existing color and sharpness are satisfactory, an associated control to maintain the same color and the same sharpness is conducted.

When the existing color and sharpness are not satisfactory, a signal from the CCD is changed by the control of the reading speed of the reading means, the aperture control of the CCD of the reading means, and the control of bias voltage. Alternatively, in the case of a light source in which the light amount to irradiate the document is changed, and the color temperature is changed, a filter may be used for compensation. For example, when the aperture of the CCD is stopped down, the output is lowered, and the density of the output signal from the output apparatus is increased. In this case, there is a possibility that the density distribution has a gentle slope, and therefore, bias voltage is changed and the output may also be adjusted. In this case also, the density distribution is changed, therefore, it is necessary to prepare a change-table in all. Then, according to the read-out data, an image is formed by the image forming means.

(2) When the output means is not changed and copes with the aging change or a change of the result of the repair of trouble:

In the inkjet recording apparatus, even when its output has the best color, dot diameter, and density distribution at the time of installation, some changes occur by the aging change and by adjustment at the time of repairing. Further, a change in the apparatus also occurs by an exchange of recording sheets.

Colors, a dot diameter, a density distribution for each dot, and a change of the dot diameter at the ambient temperature of the inkjet, are stored in the control section of the apparatus at the time of installation, and the following detection is carried out every predetermined time, and for every predetermined number of recording sheets: a dot diameter detection; a density detection for each dot; and a detection of a change of each color, (however, at the time of a recording sheet exchange, it is preferable to positively detect a recording color change, a dot diameter change, and a density distribution change for each dot, because there is a change in the hygroscopic property or color formation property depending on the recording sheet).

As a detecting method, there is a method in which the above-described detection items are printed on a recording sheet during the night or non-operation, and the operator adjusts the changes according to the adjustment manual; or a method in which, when the recording sheet is only set to the reading apparatus, the detection is automatically conducted. The color, dot diameter, and color mixture with other color, are recorded for three colors and seven patterns, and the detection is conducted by a scanner because the recorded items can be judged according to the recorded position. The record of detection for each time may be stored in the memory.

As the result of detection, when the dot diameter is increased by 5% and the peak density is lowered to 80%, (herein, the aging change of the sensitivity of the scanner is neglected), these changes are compensated for. The change of the dot diameter can be known by scanning the CCD output, and in also the density distribution in the longitudinal and horizontal directions, the positions of the peak density and end portions (the bottom of the distribution) can be confirmed. As the cause, the damage or stain of the nozzle can be considered.

These changes can be corrected by the aperture control or output control of the CCD of the reading apparatus side. Further, although being not perfect, the distribution can also be controlled by the aperture of the CCD. Further, the dot can be read as the slightly larger dot by the control of the reading speed.

Relating to each color, a color filter of the scanner is replaced, and a color distribution at the time of filter switching in the yellow dot, is read three times, and the color for the scanner of the yellow dot is detected. In the same manner, the color dots of magenta and cyan are detected.

As the result, the condition of color mixture with other colors in the yellow dot is confirmed, and a change of the output apparatus is confirmed by its change. As the cause of this change, the aging change of the ink is considered.

From the above description, with respect to the change of the color, the distribution of the CCD output for each filter is changed, and the image is outputted so as to be more bluish, reddish, or yellowish respectively.

As described above, the present invention has the effects in which it can cope with the aging change of the output means including not only the dot diameter, but also the color, or the imperfect adjustment after repair, and when the recording medium is changed, it can detect the change of dot diameter, and the change of color, and can correct these changes.

In this connection, the above-described information relating to the characteristic of the image forming means may be inputted from the key board by the operator, or stored in a memory provided in the image forming means, read from the memory, and inputted into the control section 300.

Then, the control section 300 determines the reading condition, sends it to the film scanner section 100, and the film scanner section 100 reads out the image data according to the reading condition.

In an image forming apparatus having a film image pick-up device to image pick-up the film image, and a printer section to output a digital image onto a printing paper, the image forming apparatus according to the present invention comprising: a film detecting means for discriminating the type of the inputted film; a print size specifying means for specifying the output print size; and an image pick-up condition of the film image pick-up device is adjusted from the output of the film detecting means and the output of the print size specifying means, thereby, the image quality of the output image is not deteriorated, and the optimum print processing capacity can be provided even when any size print processing is carried out, and the print quality and the print processing capacity can be compatible with each other.

What is claimed is:

1. An image reading apparatus comprising:
   (a) means for detecting a size of a first image recorded on an original;
   (b) means for inputting a size and resolving power of a second image to be recorded on a recording medium by an image recording apparatus;
   (c) means for determining a reading condition to read the first image, the reading condition being determined based on (i) a number of pixels required for the second image and obtained from the size and the resolving power of the second image, and (ii) the size of the first image; and
   (d) means for reading the first image according to the reading condition.

2. The image reading apparatus of claim 1, wherein the determining means outputs data selected from output data of the reading means, as needed.

3. The image reading apparatus of claim 1, wherein the determining means includes a zoom lens for changing a magnification function of the inputting means according to the recording condition.

4. An image recording apparatus comprising:
   (a) means for reading a first image recorded on an original to obtain information from the first image;
   (b) image recording means for recording a second image on a recording medium according to the information from the first image;
   (c) means for inputting a size and resolving power of the second image, and a size of the first image; and
   (d) means for determining a reading condition according to (i) a number of pixels required for the second image and obtained from the size and the resolving power of the second image, and (ii) the size of the first image,
   wherein the reading means reads the first image according to said reading condition.

5. The image recording apparatus of claim 4, wherein the image recording means comprises an ink jet head, and the status inputting means input at least one of a color tone of ink, a nozzle diameter, and a size of a ink droplet of the ink jet head.

6. The image recording apparatus of claim 4, wherein the image recording means comprises a light emitting element, and the status inputting means inputs a light amount of the light emitting element.

7. The image recording apparatus of claim 4, wherein the image recording means comprises a heating element, and the status inputting means inputs a heating distribution of the heating element.

* * * * *